US009221669B2

(12) United States Patent
Tix et al.

(10) Patent No.: US 9,221,669 B2
(45) Date of Patent: Dec. 29, 2015

(54) WASTE HEAT RECOVERY SYSTEM FOR PUMPING SYSTEM

(75) Inventors: Joseph E. Tix, Hastings, MN (US); Mark T. Weinberger, Mounds View, MN (US); Richard D. Anderson, Maple Grove, MN (US); Jeffrey N. Velgersdyk, Minnetonka, MN (US); Nicholas K. Studt, Husdon, WI (US); Gregory A. Regenscheid, Maple Grove, MN (US); Matthew R. Theisen, Mahtomedi, MN (US); Kenneth C. Floer, Brooklyn Park, MN (US); Mark J. Brudevold, Fridley, MN (US); Arthur T. Graf, Roseville, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 163 days.

(21) Appl. No.: 14/123,703

(22) PCT Filed: Jun. 15, 2012

(86) PCT No.: PCT/US2012/042671
§ 371 (c)(1),
(2), (4) Date: Dec. 3, 2013

(87) PCT Pub. No.: WO2012/174380
PCT Pub. Date: Dec. 20, 2012

(65) Prior Publication Data
US 2014/0084025 A1    Mar. 27, 2014

Related U.S. Application Data

(60) Provisional application No. 61/497,827, filed on Jun. 16, 2011.

(51) Int. Cl.
*B67D 7/74* (2010.01)
*F04B 17/03* (2006.01)
(Continued)

(52) U.S. Cl.
CPC ........ *B67D 7/743* (2013.01); *B67D 7/62* (2013.01); *B67D 7/82* (2013.01); *B67D 7/845* (2013.01);
(Continued)

(58) Field of Classification Search
USPC ......... 222/146.2, 146.5, 135, 145.5, 626, 333
See application file for complete search history.

(56) References Cited

U.S. PATENT DOCUMENTS

| 2,894,265 A | 7/1959 | Reardon |
| 3,146,950 A | 9/1964 | Lancaster |

(Continued)

FOREIGN PATENT DOCUMENTS

| JP | 2007315292 A | 12/2007 |
| WO | 03-045130 A1 | 6/2003 |
| WO | 2010111027 A2 | 9/2010 |

OTHER PUBLICATIONS

European Patent Office, extended European Search Report, Mar. 12, 2015, 6 pages.

(Continued)

*Primary Examiner* — Donnell Long
(74) *Attorney, Agent, or Firm* — Kinney & Lange, P.A.

(57) ABSTRACT

A pumping system comprises an internal combustion engine, a generator, a pumping unit and a heat recovery system. The generator is driven by the internal combustion engine. The pumping unit is powered by the generator. The heat recovery system thermally couples the internal combustion engine with the pumping unit.

36 Claims, 3 Drawing Sheets

(51) Int. Cl.
  *F04B 17/05* (2006.01)
  *B67D 7/62* (2010.01)
  *B67D 7/82* (2010.01)
  *B67D 7/84* (2010.01)
  *F02G 5/00* (2006.01)
  *B05B 7/24* (2006.01)

(52) U.S. Cl.
  CPC . *F02G 5/00* (2013.01); *F04B 17/03* (2013.01); *F04B 17/05* (2013.01); *B05B 7/2497* (2013.01); *Y02T 10/16* (2013.01)

(56) References Cited

U.S. PATENT DOCUMENTS

| | | | |
|---|---|---|---|
| 3,341,081 A | | 9/1967 | King |
| 3,481,544 A | * | 12/1969 | Jackson ................ 239/130 |
| 3,561,645 A | * | 2/1971 | Hopkins ................ 222/146.2 |
| 4,951,871 A | | 8/1990 | Hata et al. |
| 4,953,753 A | | 9/1990 | Gortz |
| 5,271,521 A | * | 12/1993 | Noss et al. ................ 222/1 |
| 6,109,346 A | | 8/2000 | Hill |
| 6,319,559 B1 | | 11/2001 | Makino |
| 6,666,385 B1 | | 12/2003 | Gonitzke et al. |
| 7,264,178 B1 | | 9/2007 | Hugg |
| 2005/0023296 A1 | | 2/2005 | Bien |
| 2007/0045445 A1 | | 3/2007 | Hackel et al. |
| 2007/0170280 A1 | * | 7/2007 | Ridgeway et al. ............ 239/146 |
| 2009/0277400 A1 | | 11/2009 | Conry |
| 2010/0044462 A1 | | 2/2010 | Hugg |
| 2011/0114411 A1 | | 5/2011 | Merth et al. |

OTHER PUBLICATIONS

International Search Report and Written Opinion, mailed Feb. 25, 2013.

* cited by examiner

WASTE HEAT RECOVERY SYSTEM FOR PUMPING SYSTEM

BACKGROUND

The present invention relates generally to fluid pumping systems and more particularly to heating systems for dual component proportioners.

Fluid proportioners comprise dispensing systems that receive separate inert fluid components, mix the components in a predetermined ratio and then dispense the components as an activated compound. For example, fluid proportioners are used to dispense polyurethanes or polyureas that solidify after mixing of a resin component and an activating material, which are individually inert. After mixing, however, an immediate chemical reaction begins taking place that results in expanded rigid, or non-rigid, plastic foam or a flexible, cured thermoplastic polyurea coating of the mixture. Therefore, the two components are routed separately into the proportioner so that they can remain segregated as long as possible. A manifold receives each component after it is pumped separately and feeds the components to a sprayer including a mixing head that can be actuated by an operator. Thus, the components remain segregated until reaching the sprayer where they are simultaneously mixed and dispensed, thereby minimizing potential for fouling of components.

A typical fluid proportioner comprises a pair of positive displacement component pumps that individually draw in component fluid from separate fluid containers, sometimes with the aid of feed pumps, and pump pressurized component fluids to the manifold. The component pumps are typically driven in synchronicity by a common hydraulic or electric motor. The feed pumps are typically driven by a source of compressed air. The feed pumps and component pumps deliver the component materials to the manifold in a state ready for mixing and dispensing from the sprayer. Specifically, in order to properly trigger the chemical reaction that cures the mixed component materials, the components are often heated to an elevated temperature to reduce and balance the fluid viscosities to ensure proper cross-linking. Typically, the components are heated with electric heaters that heat the material somewhere between the component pumps and the manifold. Such heaters require a supply of external power and therefore reduce the energy efficiency of the system.

Dual component proportioners are sometimes arranged in portable configurations, such as in the cargo area of a truck for completing large-scale jobs at remote job sites. Similarly, these dual component proportioners can be mounted in a trailer pulled behind a vehicle. In such configurations, the proportioner system can be set up to utilize resources of the engine of the truck. For example, coolant from the engine can be used to heat the component materials rather than an electric heater. Likewise, the electrical system of the truck engine can be used to power components of the proportioner. Alternatively, a power take-off from the truck engine can be used to mechanically power various components. However, such embodiments require the engine of the truck to be continuously running while spraying operations are occurring. The truck engine, however, provides excess capacity than what is needed for the proportioner system both in terms of the coolant flow provided by the engine and in terms of mechanical power that is being generated for pumping the coolant or generating electricity. As such, these systems are less efficient than electric heaters. There is, therefore, a need for a more efficient component material heating system, particularly for use with portable proportioner systems.

SUMMARY

The present invention is directed to pumping systems such as dual component proportioner systems. The pumping system comprises an internal combustion engine, a generator, a pumping unit and a heat recovery system. The generator is driven by the internal combustion engine. The pumping unit is powered by the generator. The heat recovery system thermally couples the internal combustion engine with the pumping unit.

DETAILED DESCRIPTION

Figure 1:
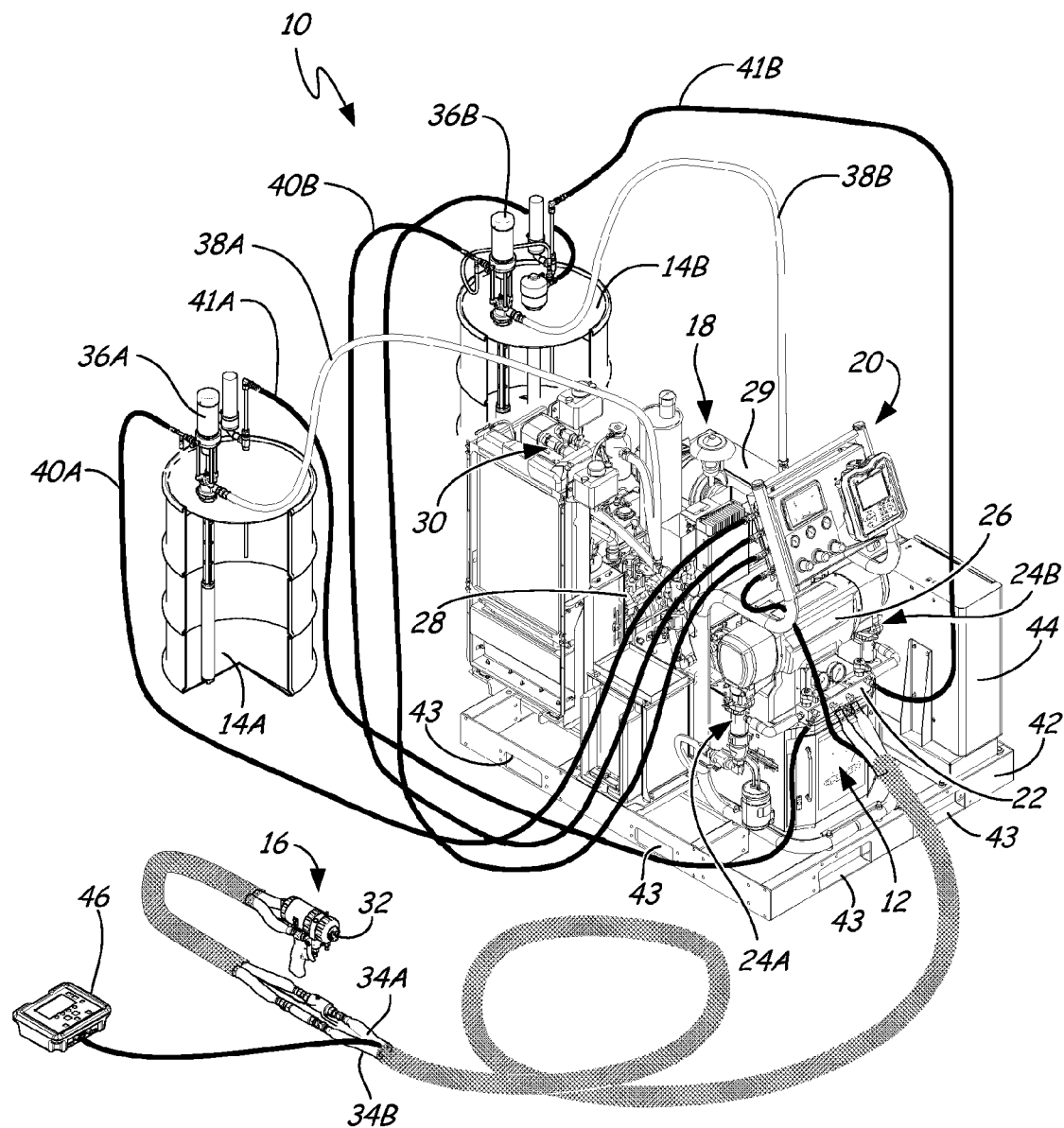
FIG. 1 shows a portable dual-component proportioner system having a pumping unit, a generator and a heat recovery system of the present invention.

FIG. 1 shows dual-component proportioner system 10 having pumping unit 12, component material containers 14A and 14B, dispensing gun 16 and generator set 18. Pumping unit 12 comprises control/display module 20, fluid manifold 22, first component pump 24A, second component pump 24B and electric motor 26. Generator set 18 includes internal combustion engine 28 and electrical generator 29. Generator set 18 and pumping unit 12 are interconnected with heat recovery system 30 of the present invention. Dispensing gun 16 includes dispense head 32 and is connected to first component pump 24A and second component pump 24B by hoses 34A and 34B, respectively. Hoses 38A and 38B connect feed pumps 36A and 36B to component pumps 24A and 24B, respectively. Compressed air from a compressor (not shown in FIG. 1) is supplied to feed pumps 36A and 36B and dispensing gun 16 through air hoses 40A and 40B, respectively. Recirculation hoses 41A and 41B connect fluid manifold 22 to feed pumps 36A and 36B, respectively.

Component material containers 14A and 14B comprise drums of first and second viscous materials that, upon mixing, form a cured structure. For example, a first component comprising a resin material, such as a blended polyol resin, is stored in component material container 14A, and a second component comprising a catalyst material that causes the resin material to harden, such as polymeric MDI (methylene diphenyl diisocyanate), is stored in component material container 14B.

Dual-component pump system 10 is configured to be mounted in a compact, transportable package in the embodiment discussed. In one application, pump system 10 is used to spray polyurethane foam insulation into wall structures and on structure roofs. Dual-component pump system 10 includes pallet 42 upon which all components of system 10 can be mounted or stored except for containers 14A and 14B, which are located separately from pallet 42. Feed pumps 36A and 36B are extended remotely from pallet 42 and pump system 10 via hoses 40A-41B. Pallet 42 and containers 14A and 14B can be mounted or stored in the cargo area or bed of a truck for transporting to different job sites. Pallet 42 includes slots 43 into which fork lift prongs can be inserted for relocating pump system 10. With the exception of containers 14A and 14B, which need to be periodically removed from the truck for replacement, dual-component pump system 10 is mounted on pallet 42 so as to be a completely independent operating system. With the addition of the air compressor, internal combustion engine 28 supplies all of the mechanical and electrical power needed by system 10 independent of operation of the truck in which system 10 is mounted. More specifically, internal combustion engine 28 inputs electrical power to electric motor 26 and inputs thermal heat into the component materials of containers 14A and 14B en route to manifold 22.

Electrical power is supplied to pumping unit 12 by generator set 18, which then distributes power to module 44. Module 44 supplies power to electric motor 26, which is used to operate component pumps 24A and 24B. Module 44 also supplies power to other components of system 10, such as the aforementioned air compressor, a fan for a radiator of internal combustion engine 28, valves for controlling flow of heat transfer fluid through heat recovery system 30 and a boost heater, which are all discussed with reference to FIG. 2. Compressed air from the aforementioned compressor is supplied to control/display module 20, which distributes compressed air to feed pumps 36A and 36B through hoses 40A and 40B to supply flows of the first and second component materials to component pumps 24A and 24B, respectively. Component pumps 24A and 24B are operated by the electric motor 26, which is operator controlled through control/display module 20. Heat generated by internal combustion engine 28 is scavenged by heat recovery system 30 and input into flow of the component materials. In the discussed embodiment, heat is input to the component materials between feed pumps 36A and 36B and component pumps 24A and 24B. When a user operates dispensing gun 16, pressurized component materials supplied to manifold 22 by pump 24A and pump 24B are forced to mixing head 32. Mixing head 32 blends the first and second component materials to begin the solidification process, which completes when the mixed component materials are sprayed.

An operator can control input of the component materials into dispensing gun 16 by controlling feed pumps 36A and 36B and component pumps 24A and 24B at control/display module 20. Control/display module 20 includes a screen for displaying information to an operator of system 10. Control/display module 20 also includes operator controls that permit output of system 10 to be controlled. For example, an operator of dual-component pump system 10 can specify at an input in control/display module 20 that pumping unit 12 will operate to provide a constant pressure of the first and second component materials to manifold 22 and a constant temperature of the component materials to manifold 22. As such, control/display module 20 will control electrical power supplied to pumps 24A and 24B, compressed air supplied to feed pumps 36A and 36B and spray gun 16, and control the rate of heat transfer from heat recovery system 30 to pump system 12. Further, the same controls can alternatively be accessed at remote control 46.

Although heat recovery system 30 has been described with reference to a dual-component proportioner pumping system powered directly by an electric motor, the invention can be applied to other types of pumping systems. For example, component pumps 24A and 24B may be hydraulically actuated by fluid power circulated by an electric motor, such as described in PCT Application Number US2010/003120, which is assigned to Graco Minnesota Inc. Further, other types of pump systems that utilize heat to condition material for pumping, applying or dispensing may utilize the systems and methods of the present invention.

Figure 2:
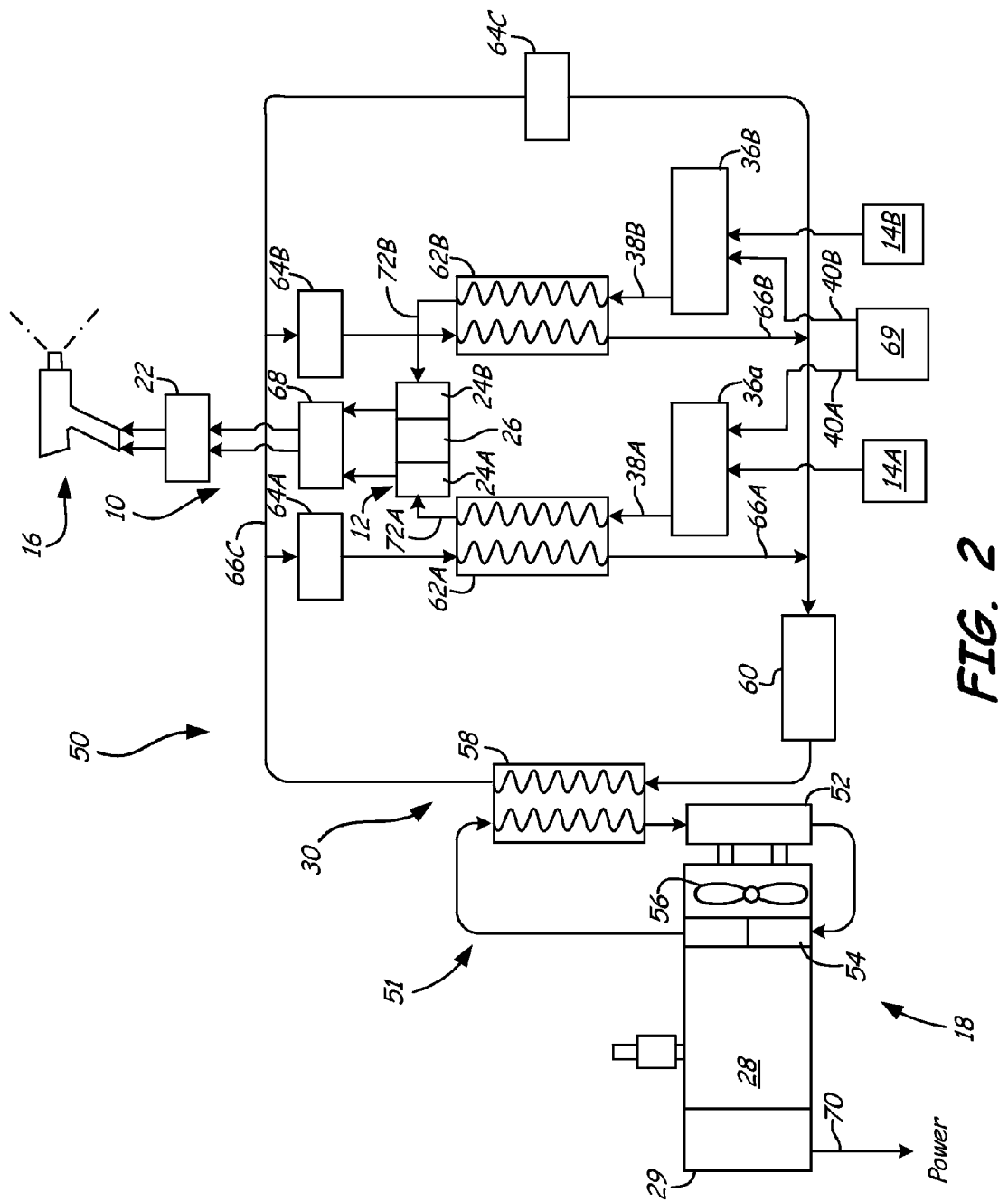
FIG. 2 shows a schematic of a first embodiment of the portable dual-component proportioner system of FIG. 1 having a heat recovery system with an indirect secondary loop.

FIG. 2 shows a schematic of a first embodiment of dual-component proportioner system 10 of FIG. 1 having heat recovery system 30 with primary, engine loop 51 and indirect, secondary loop 50. Pumping unit 12, which includes component pumps 24A and 24B and electric motor 26, is coupled to dispensing gun 16 and feed pumps 36A and 36B. Feed pumps 36A and 36B receive component material from containers 14A and 14B, respectively. Generator set 18 includes internal combustion engine 28, electrical generator 29, radiator 52, water pump 54 and fan 56. Heat recovery system 30 includes inter-loop heat exchanger 58, circulating pump 60, first component heat exchanger 62A, second component heat exchanger 62B, valves 64A, 64B and 64C and fluid lines 66A, 66B and 66C. Pump system 10 may also include electrical boost heater 68 and compressor 69.

Internal combustion engine 28, which in one embodiment comprises a diesel engine, combusts fuel to produce rotational shaft power that drives electrical generator 29. Specifically, in one embodiment internal combustion engine 28 comprises a 30 Horse Power (~22.4 kilowatts) diesel engine. System 10 may include a fuel tank mounted to pallet 42 (FIG. 1) or internal combustion engine 28 may be configured to receive fuel from a remote fuel tank mounted in the cargo area or bed of the truck in which system 10 is stowed. Internal combustion engine 28 operates independently from any engine and fuel system used to power the truck in which system 10 is or can be mounted. As such, system 10 can be operated in a stationary environment, such as in a permanent installation at a manufacturing facility or at a temporary installation at a construction site.

Internal combustion engine 28 provides mechanical input to electrical generator 29. In one embodiment, electrical generator 29 comprises a twenty-two kilowatt capacity. Electricity generated by electrical generator 29 is provided to pumping unit 12 through wiring 70 in order to power control/display module 20 (FIG. 1) and electric motor 26. Other electrical components of system 10, such as circulation pump 60, fan 56, boost heater 68 and valves 64A-64C, are also wired (not shown for clarity) to receive electrical power from electrical generator 29. Feed pumps 36A and 36B are air powered to receive component materials from containers 14A and 14B, such as by having an inlet tube submerged into the component material, and to deliver component material to pumping system 12 through hoses 38A and 38B, respectively. In the described embodiment, feed pumps 36A and 36B are air driven by compressed air regulated by control/display module 20 (FIG. 1) of pumping unit 12. Pumping unit 12 receives compressed air from compressor 69, which can either be mounted in the cargo area or bed of the truck in which system 10 is stowed, or on pallet 42 (FIG. 1). In either embodiment, compressor 69 is supplied with electrical power from electrical generator 29 and delivers compressed air to control/display module 20. As energized by generator 29 through electric motor 26, component pumps 24A and 24B dispense component materials from containers 14A and 14B to manifold 22, which supplies dispensing gun 16.

Internal combustion engine 28 generates heat from the combustion process. As such, internal combustion engine 28 is provided with a coolant in primary, engine loop 51. Pump 54 of engine loop 51 circulates coolant from radiator 52 across the heated components within internal combustion engine 28. In one embodiment, engine loop 51 includes a liquid-to-liquid plate heat exchanger. Fan 56 is configured to provide convective cooling to the coolant within radiator 52 and is configured so as to be intermittently operated by control/display module 20. Coolant flow within engine loop 51 also flows through inter-loop heat exchanger 58. Inter-loop heat exchanger 58 is also connected to a coolant flow within secondary loop 50 provided by fluid line 66C. Circulation pump 60 and fluid line 66C provide a continuous re-circulating flow of fluid through inter-loop heat exchanger 58 while valve 64C is open. Inter-loop heat exchanger 58, which in one embodiment comprises a liquid-to-liquid plate heat exchanger, transfers heat between engine loop 51 and secondary loop 50. During operation of pump system 10, heat is transferred from coolant within engine loop 51 to fluid in fluid line 66C. The fluid within fluid line 66C may comprise any suitable heat transfer fluid such as water, ethylene glycol, mineral oil, silicone oil or the like.

Heated fluid within fluid line 66C flows into fluid lines 66A and 66B when valve 64C is closed and valves 64A and 64B are open. Valves 64A, 64B and 64C comprise actively controlled check valves that are operated by control/display module 20 to control the temperature of component material in hoses 72A and 72B, which extend between heat exchangers 62A and 62B and pumps 24A and 24B, respectively. Fluid line 66A extends from a high pressure side of fluid line 66C, through valve 64A, through first component heat exchanger 62A and back to a low pressure side of fluid line 66C. Similarly, fluid line 66B extends from a high pressure side of fluid line 66C, through valve 64B, through second component heat exchanger 62B and back to a low pressure side of fluid line 66C. Heat exchangers 62A and 62B comprises fluid-to-fluid heat exchangers that transfer heat between fluid lines 66A and 66B to material hoses 72A and 72B respectively. During operation of pump system 10, heat is transferred from coolant within lines 66A and 66B to component materials within hoses 72A and 72B. In the discussed embodiment, heat exchangers 62A and 62B heat the component material to a first temperature, such as approximately 140° F. (~60.0° C.). If it is desired to heat the component material to elevated temperatures beyond what heat exchangers 62A and 62B can provide, electrical boost heater 68 is actuated by control/display module 20. Boost heater 68 inputs additional heat into the component material between pumps 24A and 24B and manifold 22. In one embodiment, electrical boost heaters comprise 2,000 Watt heaters, one for each of pumps 24A and 24B, that heat the component material to approximately 180° F. (~82.2° C.).

Figure 3:
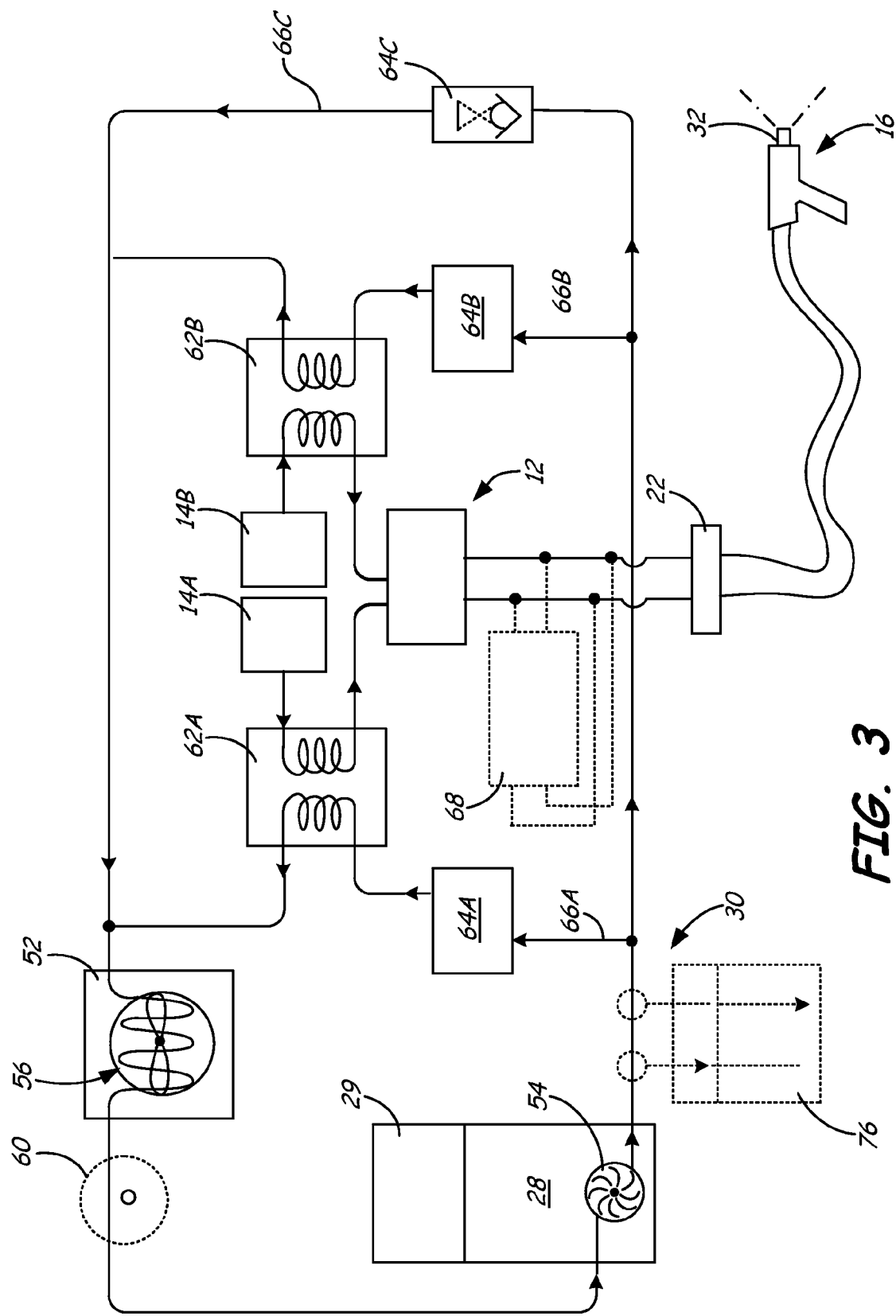
FIG. 3 shows a schematic of second embodiment of the portable dual-component proportioner system of FIG. 1 having a heat recovery system with a direct engine loop.

FIG. 3 shows a schematic of a second embodiment of portable dual-component proportioner system 10 of FIG. 1 having heat recovery system 30 with a direct engine loop. Heat recovery system 30 of FIG. 3 includes all of the same components as the embodiment of FIG. 2 except inter-loop heat exchanger 58. In such an embodiment, engine water pump 54 is directly coupled to fluid line 66C, thereby directly inputting engine heat into heat exchangers 62A and 62B. Thus, the need for engine loop 51 is eliminated. Direct loop heat recovery permits more efficient heat transfer between engine 28 and heat exchangers 62A and 62B. The direct loop method, however, is more restricted in controlling temperature of heat exchangers 62A and 62B. For example, flow of coolant through fluid line 66C is limited by water pump 54 of internal combustion engine 28. Circulation pump 60 can aid pump 54, but is limited by the capacity of pump 54. Whereas in the secondary loop method of FIG. 2, circulation of coolant through fluid line 66C can be controlled freely by the speed and capacity of circulation pump 60 alone. In order to better allow the direct loop cooling method of FIG. 3 to control temperature, fluid line 66C is provided with reservoir 76. Reservoir 76 allows additional heat transfer fluid to be stored in heat recovery system 30 to provide another variable in controlling the temperatures within heat recovery system 30.

The heat recovery system of the present invention permits heat that would otherwise be wasted to be input into a desirable location: component materials that need to cure at elevated temperatures or that need to be prevented from curing at low temperatures. Waste heat that is otherwise expelled to the atmosphere is transferred to a heat transfer fluid that is thermally coupled through a heat exchanger to component material of a pumping system. The present invention is particularly suitable for use with portable pumping systems that are self-sustaining. For example, a self-sustaining pumping system includes an internal combustion engine that generates all mechanical power needed to run electrical, pneumatic and mechanical systems of the pumping system, independent of operation of any external engines or power sources. As such, heat from the required self-sustaining operation of the internal combustion engine is recovered and efficiently transferred to the component material. The heat recovery system of the present invention is more efficient than previous systems that require an external power plant to provide heating and electrical input. For example, a typical diesel engine that provides motive power to a truck into which system 10 of the present invention is mounted provides many times the horsepower, electrical wattage and heat than is needed by system 10.

Although the present invention has been described with reference to preferred embodiments, workers skilled in the art will recognize that changes may be made in form and detail without departing from the spirit and scope of the invention.

The invention claimed is:

1. A system comprising:
    an internal combustion engine;
    a generator driven by the internal combustion engine;
    a pumping unit powered by the generator wherein the pumping unit comprises:
        a first pump configured to receive a first fluid component;
        a second pump configured to receive a second fluid component;
        a manifold configured to receive the first and second fluid components from the first and second pumps; and
        a dispenser that receives the first and second fluid components from the manifold, the dispenser having a mix head that mixes the first and second fluid components; and
    a heat recovery system thermally coupling the internal combustion engine with the pumping unit, wherein the heat recovery system scavenges heat generated by the internal combustion engine and delivers the scavenged heat to the pumping unit to separately heat the first fluid component and the second fluid component prior to mixing of the first and second fluid components by the mix head.

2. The system of claim 1 wherein the pumping unit further comprises:
    an electric motor mechanically coupled to the first and second pumps, the electric motor being powered by the generator.

3. The system of claim 2 wherein:
    the internal combustion engine includes a radiator that receives heat input from operation of the internal combustion engine.

4. The system of claim 3 wherein the heat recovery system comprises:
    a first heat exchanger in thermal communication with the first pump and the radiator; and a second heat exchanger in thermal communication with the second pump and the radiator.

5. The system of claim 4 wherein the radiator is in fluid communication with the first and second heat exchangers.

6. The system of claim 4 wherein the heat recovery system comprises:
an inter-loop heat exchanger comprising:
a first circuit in fluid communication with the radiator; and
a second circuit in fluid communication with the first and second heat exchangers.

7. The system of claim 4 and further comprising:
a pump configured to circulate a heat transfer fluid through the first and second heat exchangers.

8. The system of claim 4 and further comprising:
a control module for operating the electric motor.

9. The system of claim 8 and further comprising:
valves for regulating flow of a heat transfer fluid through the first and second heat exchangers, the valves being controlled by the control module.

10. The system of claim 8 and further comprising:
a fan for directing a flow of cooling air across the radiator, the fan being controlled by the control module.

11. The system of claim 1 and further comprising:
a boost heater in thermal communication with the pumping unit, the boost heater being powered by the generator.

12. The system of claim 1 and further comprising:
first and second feed pumps configured to provide the first and second fluid components to the first and second pumps, respectively; and
a compressor fluidly coupled to the pumping unit to provide compressed air to the first and second feed pumps.

13. The system of claim 1 wherein the internal combustion engine, the generator, the pumping unit and the heat recovery system are mounted to a pallet.

14. A pumping system comprising:
an internal combustion engine configured to produce mechanical power and waste heat;
a radiator for receiving the waste heat from the internal combustion engine;
a generator coupled to the internal combustion engine to convert the mechanical power from the internal combustion engine into electrical power;
a pump motor coupled to the generator to receive the electrical power;
a first component pump coupled to the pump motor for pumping a first component material;
a first supply line for feeding the first component material to the first component pump;
a first component heat exchanger coupled to the first supply line; and
a heat transfer fluid loop in thermal communication with the radiator and the first component heat exchanger.

15. The pumping system of claim 14 wherein the first component heat exchanger is in direct fluid communication with the radiator.

16. The pumping system of claim 14 and further comprising:
an inter-loop heat exchanger thermally coupling the first component heat exchanger to the radiator.

17. The pumping system of claim 16 wherein the inter-loop heat exchanger comprises:
a first fluid circuit extends through the radiator, the internal combustion engine and the inter-loop heat exchanger; and
a second fluid circuit extends through the first component heat exchanger and the inter-loop heat exchanger.

18. The pumping system of claim 17 and further comprising:
a second component pump coupled to the pump motor for pumping a second component material;
a second supply line for feeding the second component material to the second component pump; and
a second component heat exchanger coupled to the second supply line;
wherein the second component heat exchanger is fluidly coupled in parallel with the first component heat exchanger in the second fluid circuit.

19. The pumping system of claim 14 and further comprising:
a first feed pump coupled to the first supply line to prime the first component pump with the first component material;
a first container for storing first component material, the first container fluidly coupled to the first feed pump; and
a compressor fluidly coupled to the first feed pump.

20. The pumping system of claim 14 and further comprising:
a boost heater coupled to the first supply line, the boost heater being powered by the generator.

21. The pumping system of claim 14 and further comprising:
a circulation pump configured to circulate a heat transfer fluid through the first component heat exchanger.

22. The pumping system of claim 14 and further comprising:
valves for regulating flow of a heat transfer fluid through the first component heat exchanger;
a fan for directing a flow of cooling air across the radiator; and
a display module including controls for operating the pump motor, the valves and the fan.

23. The pumping system of claim 14 wherein the internal combustion engine, the radiator, the generator, the pump motor, the first component pump, the first supply line, the first component heat exchanger and the heat transfer fluid loop are mounted on a pallet.

24. A system comprising:
an internal combustion engine;
a generator driven by the internal combustion engine;
a pumping unit powered by the generator wherein the pumping unit comprises:
a first pump configured to receive a first fluid component;
a second pump configured to receive a second fluid component; and
a manifold configured to receive the first and second fluid components from the first and second pumps;
first and second feed pumps configured to provide the first and second fluid components to the first and second pumps, respectively;
a compressor fluidly coupled to the pumping unit to provide compressed air to the first and second feed pumps; and
a heat recovery system thermally coupling the internal combustion engine with the pumping unit.

25. The system of claim 24 wherein the pumping unit further comprises:
a dispenser that receives the first and second fluid components from the manifold, the dispenser having a mix head that mixes the first and second fluid components.

26. The system of claim 24 wherein the pumping unit further comprises:

an electric motor mechanically coupled to the first and second pumps, the electric motor being powered by the generator.

27. The system of claim 26 wherein:
the internal combustion engine includes a radiator that receives heat input from operation of the internal combustion engine.

28. The system of claim 27 wherein the heat recovery system comprises:
   a first heat exchanger in thermal communication with the first pump and the radiator; and
   a second heat exchanger in thermal communication with the second pump and the radiator.

29. The system of claim 28 wherein the radiator is in fluid communication with the first and second heat exchangers.

30. The system of claim 28 wherein the heat recovery system comprises:
   an inter-loop heat exchanger comprising:
      a first circuit in fluid communication with the radiator; and
      a second circuit in fluid communication with the first and second heat exchangers.

31. The system of claim 28 and further comprising:
a pump configured to circulate a heat transfer fluid through the first and second heat exchangers.

32. The system of claim 28 and further comprising:
a control module for operating the electric motor.

33. The system of claim 32 and further comprising:
valves for regulating flow of a heat transfer fluid through the first and second heat exchangers, the valves being controlled by the control module.

34. The system of claim 32 and further comprising:
a fan for directing a flow of cooling air across the radiator, the fan being controlled by the control module.

35. The system of claim 24 and further comprising:
a boost heater in thermal communication with the pumping unit, the boost heater being powered by the generator.

36. The system of claim 24 wherein the internal combustion engine, the generator, the pumping unit and the heat recovery system are mounted to a pallet.

\* \* \* \* \*

UNITED STATES PATENT AND TRADEMARK OFFICE
CERTIFICATE OF CORRECTION

| | | |
|---|---|---|
| PATENT NO. | : 9,221,669 B2 | Page 1 of 1 |
| APPLICATION NO. | : 14/123703 | |
| DATED | : December 29, 2015 | |
| INVENTOR(S) | : Joseph E. Tix et al. | |

It is certified that error appears in the above-identified patent and that said Letters Patent is hereby corrected as shown below:

Title Page

Item (75) Inventors
Delete "Regenscheld"
Insert -- Regenscheid --

Signed and Sealed this
Twenty-sixth Day of April, 2016

Michelle K. Lee
*Director of the United States Patent and Trademark Office*